United States Patent
Nam et al.

(10) Patent No.: US 9,756,396 B2
(45) Date of Patent: Sep. 5, 2017

(54) METHOD AND APPARATUS FOR PROVIDING BROADCAST SERVICE

(71) Applicant: Alticast Corporation, Seoul (KR)

(72) Inventors: Sung-Woo Nam, Gyeongsangnam-do (KR); Se Rom Ham, Seoul (KR); Ji Hee Kang, Incheon (KR)

(73) Assignee: Alticast Corporation, Seoul (KR)

(*) Notice: Subject to any disclaimer, the term of this patent is extended or adjusted under 35 U.S.C. 154(b) by 281 days.

(21) Appl. No.: 13/730,175

(22) Filed: Dec. 28, 2012

(65) Prior Publication Data

US 2013/0191870 A1    Jul. 25, 2013

(30) Foreign Application Priority Data

Dec. 29, 2011  (KR) .................... 10-2011-0145836

(51) Int. Cl.
*H04N 21/422*   (2011.01)
*H04N 21/431*   (2011.01)
(Continued)

(52) U.S. Cl.
CPC ..... *H04N 21/482* (2013.01); *H04N 21/42208* (2013.01); *H04N 21/42224* (2013.01);
(Continued)

(58) Field of Classification Search
CPC ........... H04N 21/42224; H04N 21/482; H04N 21/47202; H04N 21/42204; H04N 21/4788; H04N 21/4622; H04N 21/8153; H04N 5/44591; H04N 21/4312; H04N 21/4438; H04N 5/44543; G06F 3/0482;
(Continued)

(56) References Cited

U.S. PATENT DOCUMENTS 5,666,113 A *  9/1997  Logan ................... G06F 3/0488
                                                        341/22
7,143,428 B1 * 11/2006  Bruck ................ H04N 5/44543
                                                        348/E5.105
(Continued)

FOREIGN PATENT DOCUMENTS

WO      2007-026357 A2    3/2007
WO   WO 2007026357 A2 *   3/2007
(Continued)

OTHER PUBLICATIONS

European Search Report for European Application No. 12199632.6, dated Aug. 14, 2013, 6 pages.

*Primary Examiner* — Hai V Tran
(74) *Attorney, Agent, or Firm* — Mintz Levin Cohn Ferris Glovsky and Popeo, P.C.; Kongsik Kim; Jonathon Western

(57) ABSTRACT

A method and apparatus for providing broadcast services are disclosed. One aspect of the invention provides a broadcast receiving apparatus that is connected over a network with a head-end and is configured to output a content on a screen in response to a user's request. The broadcast receiving apparatus includes: a key input receiving part configured to receive a preset key signal as input; a content identification part configured to identify a content outputted on the screen at a time point of inputting the key signal; and an option interface decision part configured to decide an option interface for the identified content.

7 Claims, 14 Drawing Sheets

(51) Int. Cl.
   *H04N 21/4788*   (2011.01)
   *H04N 21/482*    (2011.01)
   *H04N 21/472*    (2011.01)
   *H04N 21/488*    (2011.01)
   *H04N 5/44*      (2011.01)

(52) U.S. Cl.
   CPC ..... *H04N 21/4312* (2013.01); *H04N 21/4788* (2013.01); *H04N 21/47202* (2013.01); *H04N 21/4882* (2013.01); *H04N 2005/4412* (2013.01)

(58) Field of Classification Search
   CPC .. G06F 3/03547; G06F 3/041; G06F 3/04842; G06F 3/0489
   See application file for complete search history.

(56) References Cited

U.S. PATENT DOCUMENTS

| | | | | |
|---|---|---|---|---|
| 2003/0084449 | A1* | 5/2003 | Chane | H04N 5/44543 725/46 |
| 2004/0070628 | A1* | 4/2004 | Iten | G06F 3/0482 715/810 |
| 2006/0107289 | A1* | 5/2006 | DeYonker et al. | 725/37 |
| 2007/0106945 | A1* | 5/2007 | Kim | 715/740 |
| 2007/0136679 | A1* | 6/2007 | Yang | 715/772 |
| 2009/0138907 | A1* | 5/2009 | Wiser et al. | 725/34 |
| 2009/0179867 | A1* | 7/2009 | Shim et al. | 345/173 |
| 2010/0115550 | A1* | 5/2010 | Minnick et al. | 725/37 |

FOREIGN PATENT DOCUMENTS

| | | |
|---|---|---|
| WO | 2009-070193 A2 | 6/2009 |
| WO | 2009-110909 A1 | 9/2009 |

\* cited by examiner

METHOD AND APPARATUS FOR PROVIDING BROADCAST SERVICE

CROSS-REFERENCE TO RELATED APPLICATIONS

This application claims the benefit of Korean Patent Application No. 10-2011-0145836, filed with the Korean Intellectual Property Office on Dec. 29, 2011, the disclosure of which is incorporated herein by reference in its entirety.

BACKGROUND

1. Technical Field

The present invention relates to a method and apparatus for providing broadcast services, more particularly to a method and apparatus that allows a user to access various services with a simple key input.

2. Description of the Related Art

In the past, the TV set was for a unidirectional service, providing the user with a limited function such as watching programs.

As a result of active research on digital standards in recent times, broadcast signals including video, audio, and data can now be compressed into digital signals, thus allowing multiple channels, and network processing capacity has also increased, allowing bidirectional broadcast services.

Currently, it is possible to access search services, cloud services, shopping services, SNS services, and chatting services using a TV set, and there is even a log-in function that enables customized services.

Although the TV set can thus be used to provide various services, it mainly uses a remote controller having a limited keypad, and as such, is still inconvenient to use.

When a user wishes to use a different service while watching television, the user may have to search through several levels for the required service. Thus, services other than viewing or recording certain live or on-demand programs may mostly remain unused.

To address this problem, Korean Patent Publication No. 2011-04182 (title of invention: METHOD FOR PROVIDING SNS ASSOCIATED WITH TELEVISION BROADCASTING AND APPARATUS THEREOF) proposes a method of accessing certain services using short-cut keys. However, since such methods of the related art only match one short-cut key with one service, an environment for providing various services as described above would require assigning multiple short-cut keys, and there is still room for improvement in terms of applicability.

SUMMARY

An aspect of the invention provides a method and apparatus for providing a broadcast service with which users may conveniently access various services associated with broadcasts.

One aspect of the invention provides a broadcast receiving apparatus that is connected over a network with a head-end and is configured to output a content on a screen in response to a user's request. The broadcast receiving apparatus includes: a key input receiving part configured to receive a preset key signal as input; a content identification part configured to identify a content outputted on the screen at a time point of inputting the key signal; and an option interface decision part configured to decide an option interface for the identified content.

The option interface can include an indicator for accessing at least one service of cloud-uploading the identified content, transferring to a personal device, performing a related search, adding to favorites, and sharing with another user.

The content can include at least one of a live program, an on-demand program, a menu, SNS information, a chat message, and a product.

The preset key signal can be received from a remote controller, and the remote controller can transmit the preset key signal when a user presses a touch pad provided on a keypad for a preset amount of time or longer.

The broadcast receiving apparatus can further include an image generating part configured to generate a preliminary image corresponding to the identified content before outputting the option interface.

The preliminary image can include a thumbnail image and a progression-status image corresponding to the identified content.

The option interface decision part can decide on an option interface corresponding to the identified content and the current mode, where the current mode can include at least one of a family mode, a private log-in mode, and a chatting mode.

The chatting mode can be configured to concurrently output a chat message with another user and a live or an on-demand program on the screen, where the option interface in the chatting mode can include an indicator that enables content sharing in a limited manner with only the user currently involved in the chat.

The option interface can include a multiple number of indicators that can be selected by a touchpad or a direction key equipped on a remote controller.

The option interface decision part can decide to deactivate or exclude at least some of the plurality of indicators depending on the identified content.

Another aspect of the invention provides a method of providing a service at a broadcast receiving apparatus connected over a network with a head-end, where the method includes: displaying a content in response to a user request; receiving a preset key signal as input; identifying a content outputted on a screen at a time point of receiving the key signal; and outputting an option interface that enables a user to select one or more options for the identified content.

Yet another aspect of the invention provides a computer-readable recorded medium on which a program of instructions for performing the method described above is recorded.

Certain embodiments of the invention provide greater convenience in using services, allowing a user to access various different functions according to the content currently being viewed or used, when the user enters a preset key input.

Additional aspects and advantages of the present invention will be set forth in part in the description which follows, and in part will be obvious from the description, or may be learned by practice of the invention.

DETAILED DESCRIPTION

Figure 1:
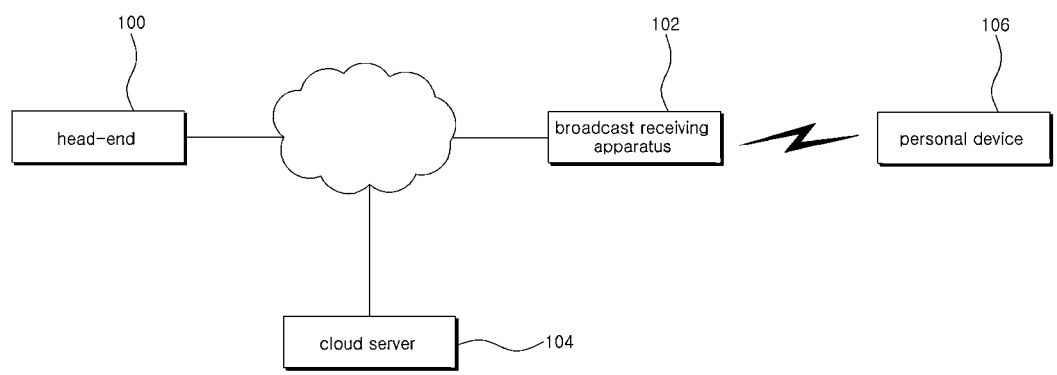
FIG. 1 illustrates the composition of a system for providing broadcast services according to an embodiment of the invention.

As the present invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the present invention. In describing the drawings, like reference numerals are used for like elements.

Certain embodiments of the invention will be described below in more detail with reference to accompanying drawings. For easier understanding of the overall inventive concept, the same reference numbers are used for the same elements regardless of the figure number.

FIG. 1 illustrates the composition of a system for providing broadcast services according to an embodiment of the invention.

As illustrated in FIG. 1, a system for providing broadcast services according to an embodiment of the invention can include a head-end 100 and a broadcast receiving apparatus 102 connected with the head-end 100 over a network.

The head-end 100 may provide live programs or on-demand programs according to a preset schedule.

The head-end 100 may convert audio and video (AV) signals for various broadcast channels into a preset format and may transmit the converted broadcast signals to the broadcast receiving apparatus 102.

Also, the head-end 100 can include a separate communication server (e.g. a return-path server) for processing users' requirements through an uplink channel, to provide an Internet service and various communication services.

For example, the head-end 100 can be connected to a search server (not shown) to provide search results for a search requested by the user, and can cooperate with a chat server or an SNS server (not shown) to allow multiple users to participate in chatting and SNS services via the broadcast receiving apparatus 102.

Also, the head-end 100 according to an embodiment of the invention may cooperate with a cloud server 104 to provide the support that enables the user to upload desired contents onto the cloud server 104.

For example, the user can upload a program being viewed on the broadcast receiving apparatus 102 to the cloud server 104, to use the uploaded content later on another device (e.g. a cell phone, desktop PC, tablet PC, etc.).

The broadcast receiving apparatus 102 according to this embodiment can include any terminal that is capable of receiving and decoding broadcast signals from the head-end 100 and providing additional services such as chatting and SNS.

The broadcast receiving apparatus 102 according to this embodiment can be, but is not limited to, a typical TV set or a set-top box, and can include any device capable of receiving broadcast signals, such as a smart phone, tablet PC, desktop PC, etc.

The descriptions that follow will be provided for an example in which it is assumed that the broadcast receiving apparatus 102 is a set-top box.

Also, the descriptions will assume that the personal device connected with the set-top box is a smart phone or a tablet PC. However, the invention is not thus limited, and the personal device can include any apparatus having either a wired or a wireless connection with an apparatus that supports the option selection function triggered by a preset key signal as described below.

With the current wide-spread use of mobile personal devices 106 such as smart phones and tablet PCs, it is possible to provide broadcast-related services through a personal device having a wired or wireless connection with the broadcast receiving apparatus 102.

For example, the broadcast receiving apparatus 102 can transfer a program being viewed by a user to the user's personal device 106 or transfer information related to the program. Also, a chat service used via the broadcast receiving apparatus 102 can be used on a personal device 106 according to the user's request.

Here, the broadcast receiving apparatus 102 and the personal device 106 can be connected via a near-field wireless network such as WiFi, but the invention is not thus limited, and the personal device 106 can receive a service being used on the broadcast receiving apparatus 102 via a typical mobile communication network or via the Internet network, for example.

According to an embodiment of the invention, the broadcast receiving apparatus 102 may, upon receiving a preset key signal as input, enable the user to access a desired service related to the content currently shown on the screen.

Also, in some examples, the broadcast receiving apparatus 102 can differentiate modes, judging whether the current mode is family mode, private log-in mode, etc., to enable access to a service in correspondence to the mode.

Figure 2:
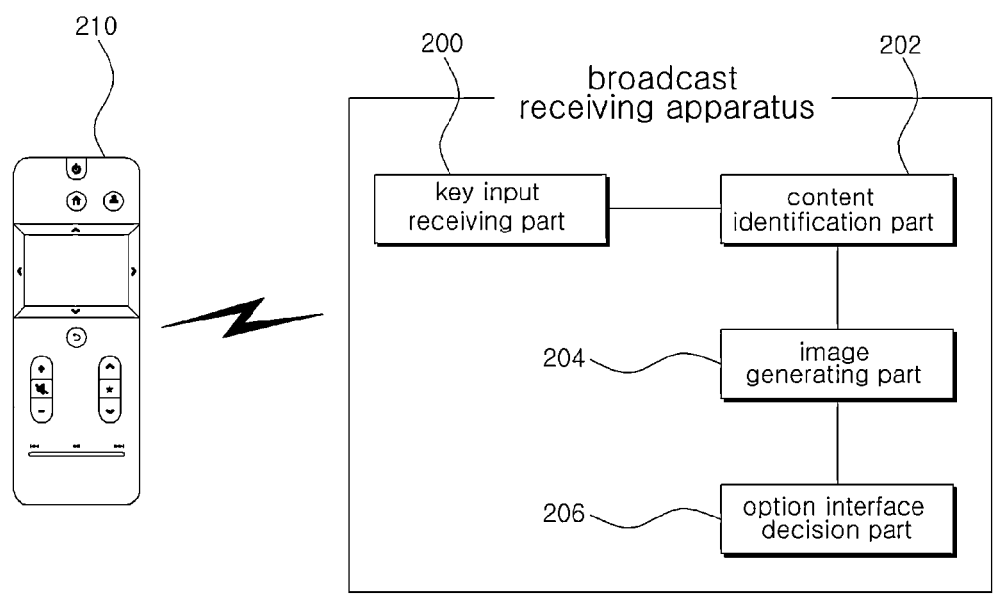
FIG. 2 is a block diagram illustrating the detailed composition of a broadcast receiving apparatus according to an embodiment of the invention.

FIG. 2 is a block diagram illustrating the detailed composition of a broadcast receiving apparatus according to an embodiment of the invention.

As illustrated in FIG. 2, a broadcast receiving apparatus 102 according to an embodiment of the invention can include a key input receiving part 200, a content identification part 202, an image generating part 204, and an option interface decision part 206.

The descriptions that follow will be provided for an example in which it will be assumed that the broadcast receiving apparatus 102 is a set-top box connected with a separate display apparatus, and that the key input receiving part 200 receives a key signal from a remote controller 210.

As the features for outputting a program (live, on-demand) received from the head-end 100 onto a screen is already known to those skilled in the art, the description of these features will be omitted here.

The content identification part 202 according to an embodiment of the invention may identify the content currently outputted on the screen, when a preset key signal is inputted through the key input receiving part 200.

Figure 3:
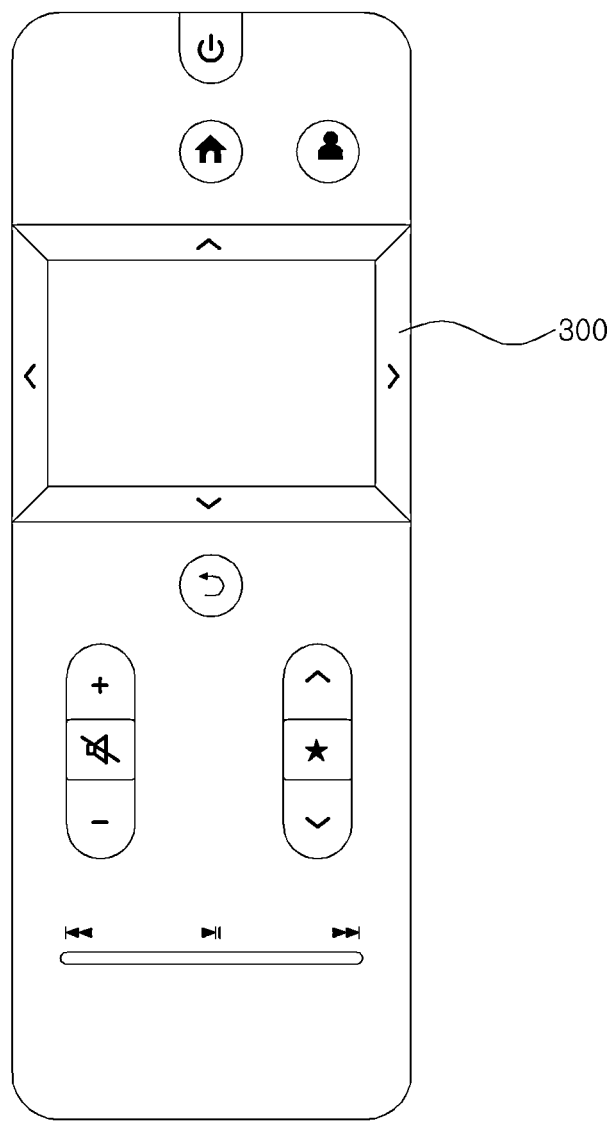
FIG. 3 illustrates the composition of a remote controller according to an embodiment of the invention.

As illustrated in FIG. 3, the remote controller 210 according to an embodiment of the invention can include a touch pad 300.

According to this embodiment, when the user presses the touch pad 300 for a preset amount of time or longer, the remote controller 210 may generate and output a preset key signal.

The content identification part 202 may identify the content outputted on the screen at the time point when the preset key signal was inputted.

The content shown on the screen can include not only video content such as live programs and on-demand programs, but also at least one of a menu, SNS information, chat messages, and a product.

The image generating part 204 may generate a different preliminary image depending on the identified content.

Here, the preliminary image may be an image that enables the user to recognize that an operation is being performed in response to the user's request, and include a thumbnail image 400 and a progression-status image 402.

Figure 4A:
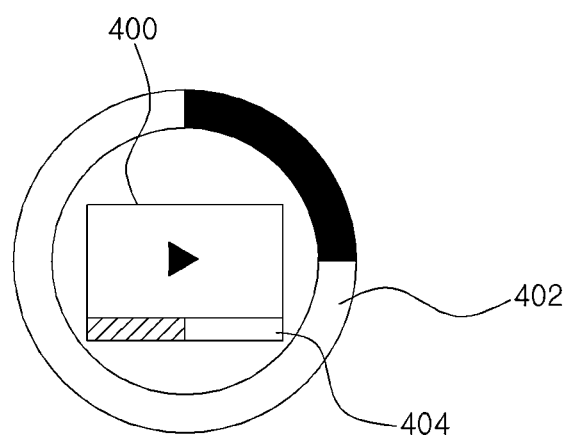
FIG. 4A, FIG. 4B, FIG. 4C, and FIG. 4D illustrate preliminary images according to an embodiment of the invention.
Figure 4B:
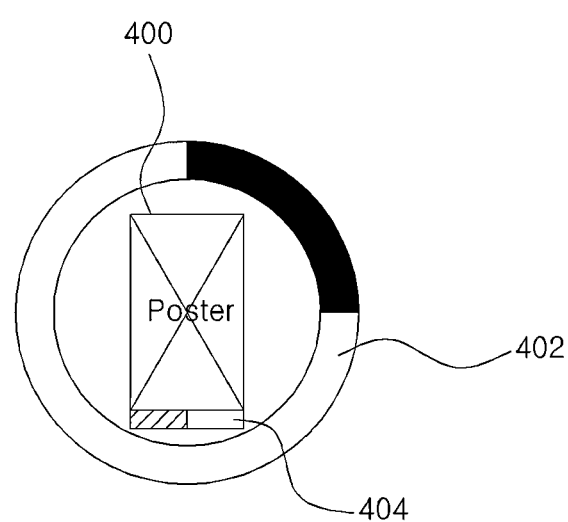
Figure 4C:
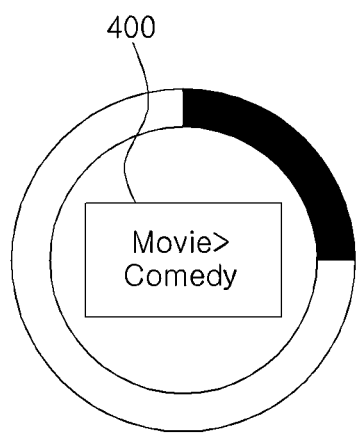
Figure 4D:
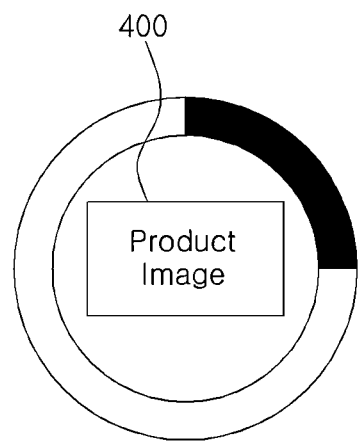

For example, if the content shown on the screen is a live program, the thumbnail image can include a channel name (logo) or a program name (FIG. 4A). If it is an on-demand program, the image can include an on-demand title name (FIG. 4B); if it is a menu, the image can include the menu position (e.g. VOD>Comedy) (FIG. 4C); if it is a product, the image can include the product name or product image (FIG. 4D).

In the case of a live program or an on-demand program, the preliminary image can additionally include a replay status image 404.

The progression-status image may be an image by which to recognize the time left until the option interface described below will be outputted. The progression-status image can be formed as a ring-shaped bar as illustrated in FIG. 4A to 4D, but is not thus limited.

The option interface decision part 206 may decide the option interface, having one or more option selections, for the identified content.

Figure 5:
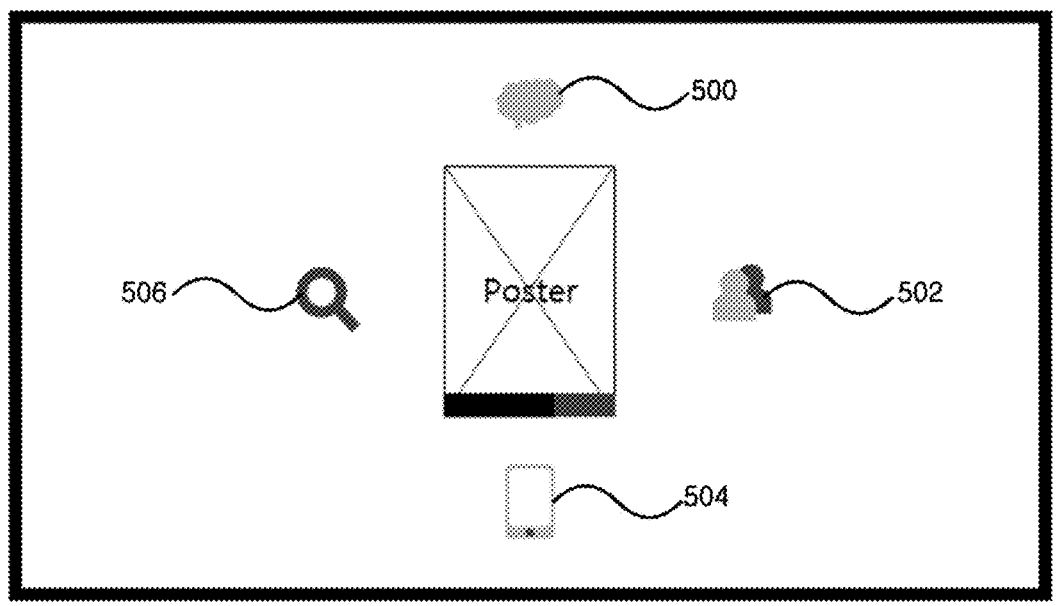
FIG. 5 illustrates an option interface according to an embodiment of the invention.

As illustrated in FIG. 5, an option interface according to this embodiment can include indicators for accessing different services for a content which can include at least one of uploading to a cloud, transferring to another device, performing a related search, and sharing with another user.

Here, an indicator can be an icon shaped so as to allow a user to distinguish different services, but the invention is not thus limited. The indicator can also be an image or text, for example, which allow a user to distinguish different services.

In the following descriptions, it will be assumed that the indicators are icons.

As in the example shown in FIG. 5, a cloud upload icon 500 can be displayed above the thumbnail image, a content sharing icon 502 can be displayed to the right of the thumbnail image, a transfer to personal device icon 504 can be displayed under the thumbnail image, and a related search icon 506 can be displayed to the left of the thumbnail image.

While FIG. 5 illustrates only four icons, various service access icons related to the broadcast, such as adding to favorites, can be used in addition to or instead of the icons above, as necessary.

Using a program as an example, the user can select the cloud upload icon 500 to register the program currently being viewed to the cloud server 104, so that the user may use the registered program at another place, at another time, through another device.

The content sharing icon 502 can enable the user to recommend a particular program to another user, the transfer to a personal device 504 can enable the user to access a program from a personal device, and the related search icon 506 can enable the user to easily perform a search related to the program currently being viewed.

The thumbnail image 400 and icons 500 to 506 described above can be displayed simultaneously on a touch pad on the remote controller 210, and the user can select an icon on the touch pad.

However, the invention is not thus limited, and the user can select one of a multiple number of icons using a direction key included on the remote controller 210, for example.

According to an embodiment of the invention, the option interface decision part 206 may decide to deactivate or exclude certain icons according to the identified content, and the decided option interface may be outputted on the screen.

For example, in the case of a live or an on-demand program, all of the icons can be included, as illustrated in FIG. 5.

Figure 6:
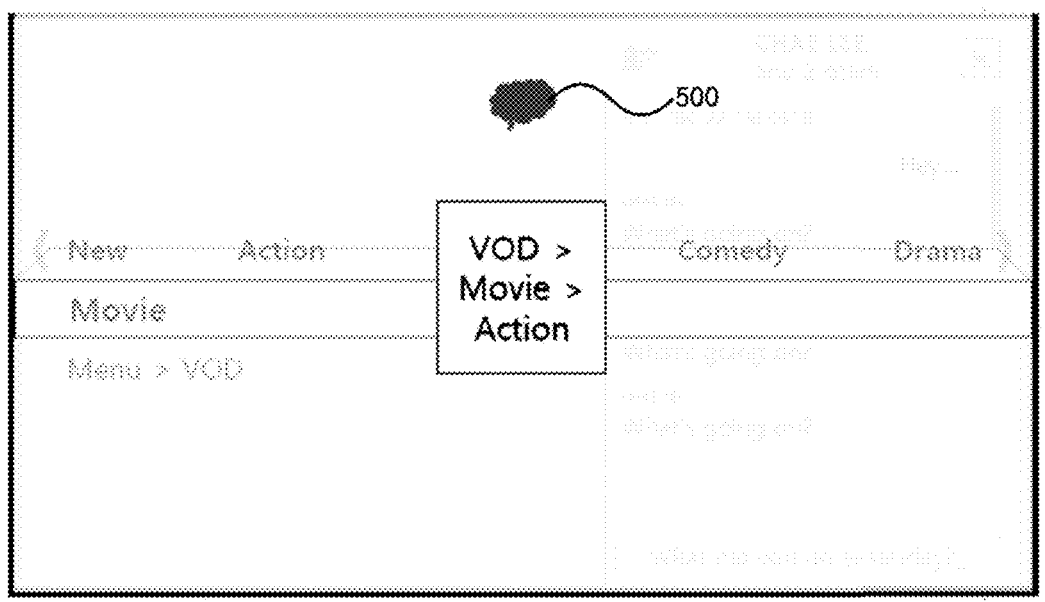
FIG. 6 illustrates an option interface according to an embodiment of the invention when the identified content is a menu.

However, if the identified content is a menu, the option interface can include only the cloud upload icon 500, as illustrated in FIG. 6.

In this embodiment, the menu can be defined for a preferred genre, and the user, while searching through the menu via the broadcast receiving apparatus 102, can easily register the preferred genre on the cloud server 104 via the option interface.

Since such information on a preferred genre is unlikely to be transferred to a personal device or used in a related search, etc., the option interface decision part 206 according to this embodiment may decide to include only the cloud upload icon 500 if the content displayed on the screen is a menu.

Figure 7:
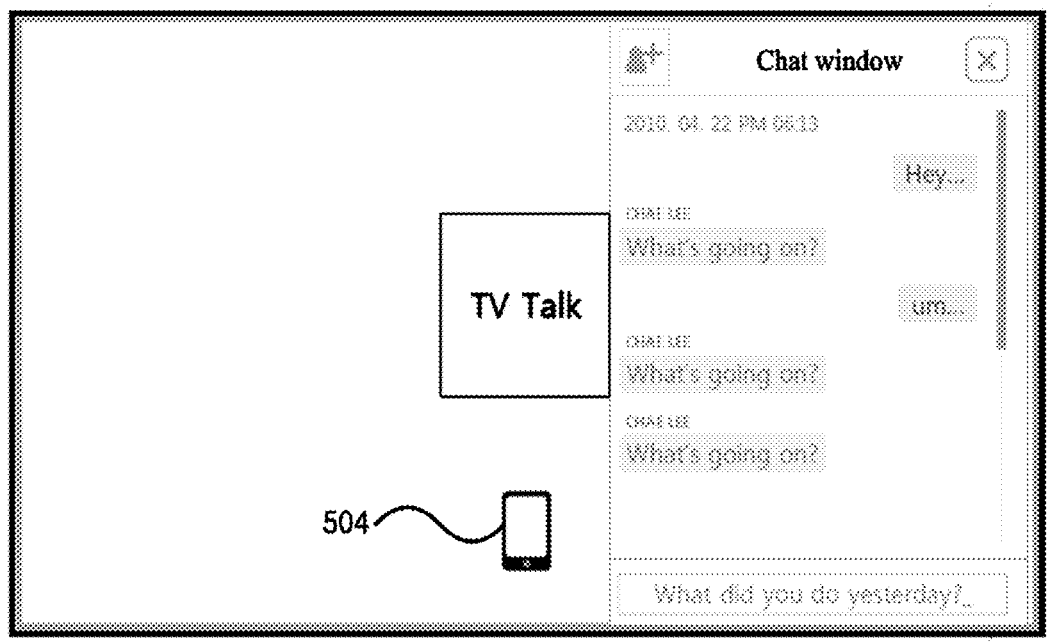
FIG. 7 illustrates an option interface according to an embodiment of the invention when the identified content is a chat message.

Also, if there is a preset key input while a chat message is being displayed, the option interface decision part 206 may provide control such that an option interface is outputted which includes only the transfer to a personal device icon 504 at the bottom, as illustrated in FIG. 7.

FIG. 7 illustrates an individual service screen, that is, with only a chat service and without viewing a program. The broadcast receiving apparatus 102 according to this embodiment can provide a chat service simultaneously with a program for viewing, and this will be described later in more detail in the description of the chatting mode.

The family mode, described below, may not support a chat service; and in the case of a family mode, the option interface itself may not be activated even if the identified content is a chat message.

According to an embodiment of the invention, when a preset key signal is inputted, different preliminary images and option interfaces may be outputted depending on the content displayed on the screen, so that the user can easily access various services associated with the current content with a simple manipulation.

The above illustrates an example of identifying the content shown on the screen and outputting an option interface according to the identified content.

The option interface decision part 206 according to an embodiment of the invention can decide which icons are to be included in the option interface based not only on the content but also on the current mode.

The modes according to this embodiment can include one of a family mode, private log-in mode, and chatting mode.

The family mode can be a mode that does not require log-in by a particular user within a group (family), and the family mode can be the default mode.

Figure 8A:
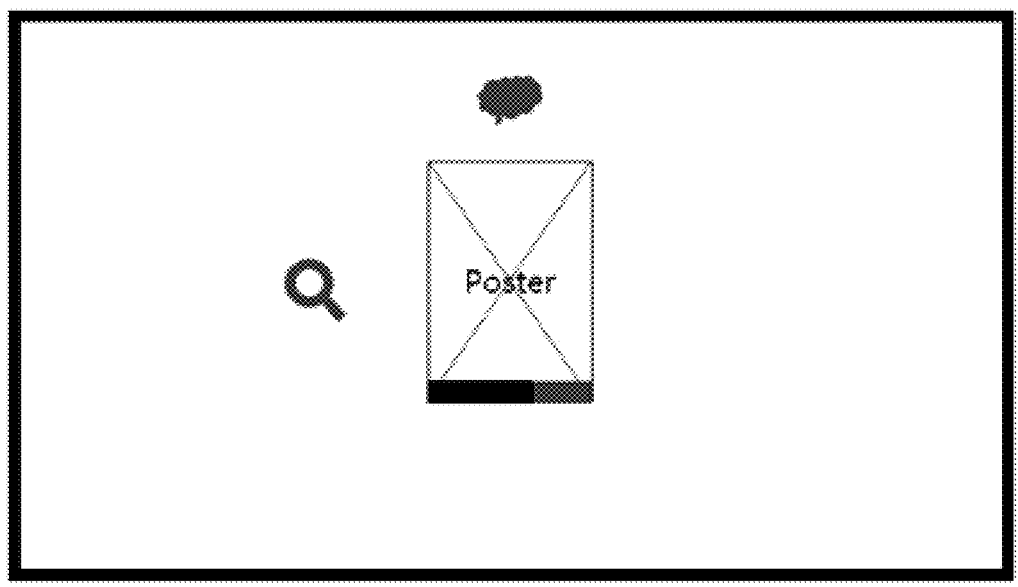
FIG. 8A, FIG. 8B, and FIG. 8C illustrate an option interface according to an embodiment of the invention when the identified content is a live or an on-demand program.
Figure 8B:
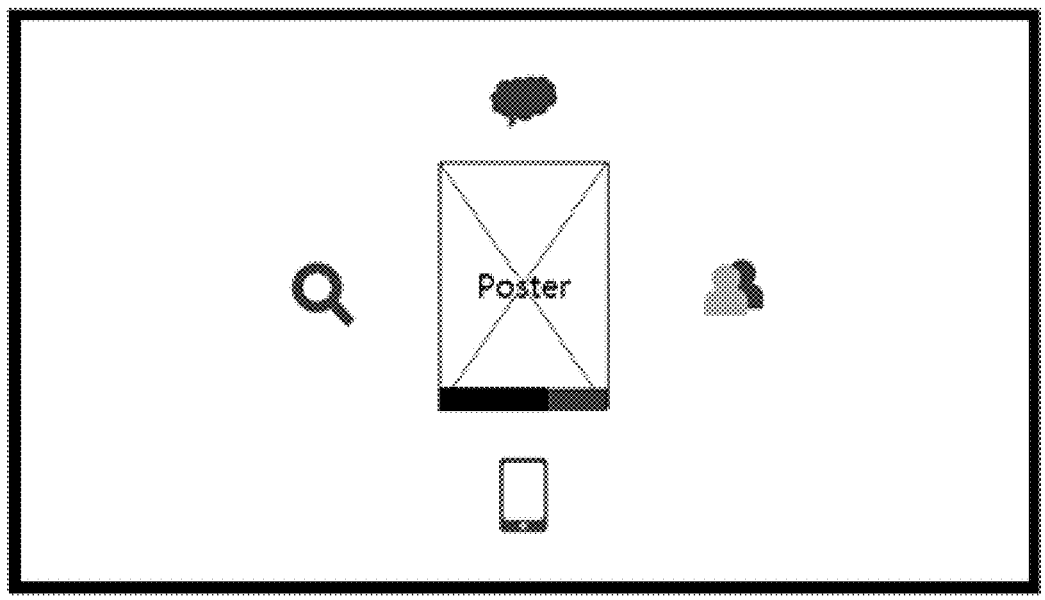
Figure 8C:
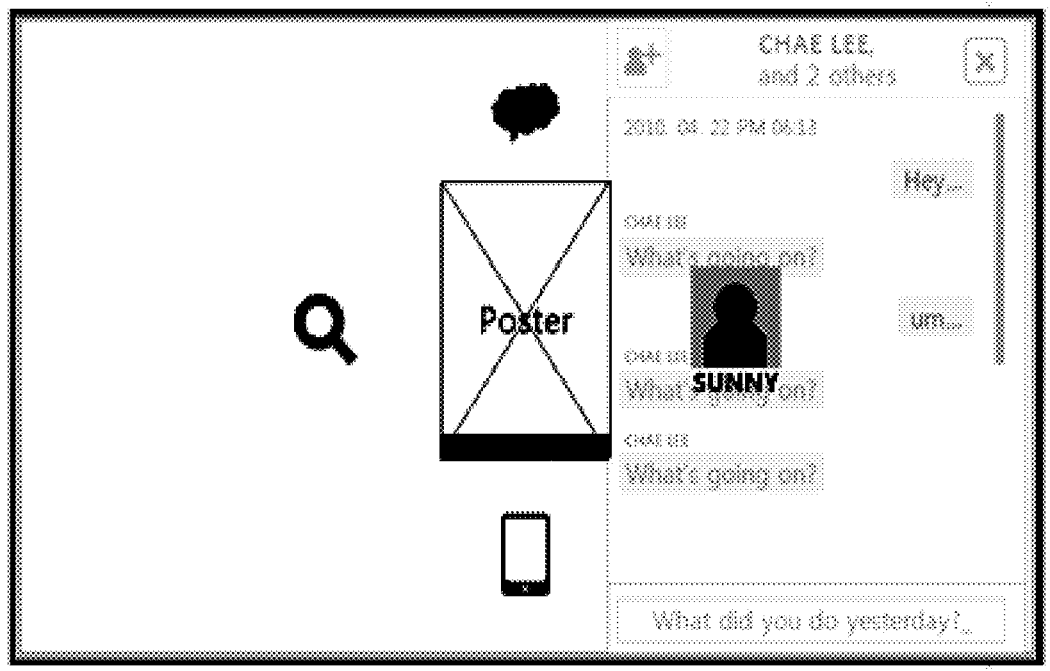

FIGS. 8A to 8C illustrate an option interface according to an embodiment of the invention when the identified content is a live or an on-demand program.

If the content displayed on the screen is a live or an on-demand program as illustrated in FIG. 8A, the option interface decision part 206 in family mode may include only the cloud upload icon 500 and the related search icon 506.

As illustrated in FIG. 8B and FIG. 8C, in private user log-in mode, all icons may be included in the option interface.

If the user selects the content sharing icon 502 in FIG. 8B, a pre-registered list of friends can be outputted, and the user can select one or more friends to whom the user may recommend the program.

However, in chatting mode, an example of which is illustrated in FIG. 8C, and in which the user uses a chat services at the same time as viewing a program, the option interface decision part 206 may include icons for the identifying the chatting counterpart in the option interface, and the user can recommend (share) the content with only the counterpart involved in the chat.

In the foregoing, the option interface is described as being outputted when a touch pad 300 equipped on the remote controller 210 is pressed for a certain amount of time.

However, the invention is not thus limited, and the broadcast receiving apparatus 102 can perform the same procedures when a particular key button equipped on the remote controller 210 is pressed for a certain amount of time or a preset key button is inputted, for example. It is also possible to select one of the icons of the option interface by using direction keys on the remote controller 210.

Figure 9:
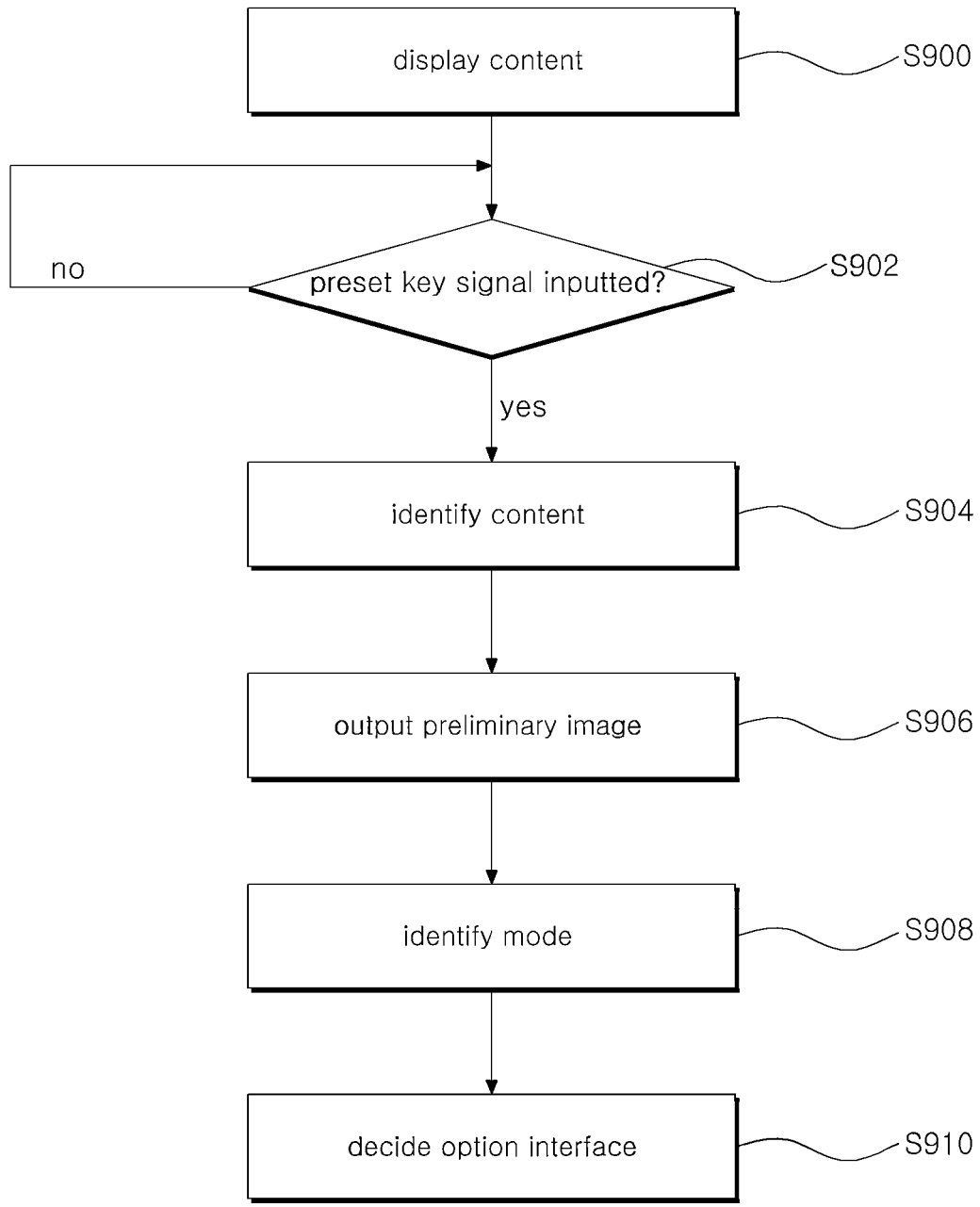
FIG. 9 is a flowchart of a process for providing broadcast services according to an embodiment of the invention.

FIG. 9 is a flowchart of a process for providing broadcast services according to an embodiment of the invention.

Referring to FIG. 9, a broadcast receiving apparatus 102 according to this embodiment may display a content, such as a live or an on-demand program, received from a head-end 100 on the screen, or alternatively may display a menu, chat message, or product, etc., on the screen (operation 900).

The broadcast receiving apparatus 102 may determine whether or not a preset key signal is inputted (operation 902).

Here, the preset key signal can be a signal received when a touch pad 300 included on the remote controller 210 is pressed for a certain amount of time or longer.

When the preset key signal is inputted, the broadcast receiving apparatus 102 may identify the content displayed on the screen (operation 904).

The broadcast receiving apparatus 102 may output a preliminary image corresponding to the identified content (operation 906).

The preliminary image can include a thumbnail image corresponding to the identified content and an image for identifying the progression status.

Also, the broadcast receiving apparatus 102 can identify the current mode, at the same time as identifying the content (operation 908).

Here, the current mode can include one of a family mode, private log-in mode, and a chatting mode in an individual service screen.

The broadcast receiving apparatus 102 may decide on the option interface corresponding to the identified content and current mode (operation 910).

Here, operation 910 can include deciding on one or more icons to include in the option interface.

The icons of the option interface can include one of a cloud upload icon, a content sharing icon, a transfer to a personal device icon, and a related search icon.

An icon can be selected using a touch pad 300 or direction keys, at which the corresponding function may be executed.

The method for providing broadcast services described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software.

Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc.

The recorded medium can also be a transmission medium, such as optical rays, metal wires, waveguides, etc., that transports carrier waves for transmitting signals which designate the program instructions, data structures, etc.

Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A method of providing a service at a broadcast receiving apparatus connected over a network with a head-end, the method comprising:

displaying a multimedia content on a screen of a display unit;

receiving, by a processor of the broadcast receiving apparatus, a preset option interface key signal from a remote control for displaying an option interface;

receiving, by the processor, a selection of a current mode from a user, the current mode being one of a plurality of predetermined modes including a family mode, a private log-in mode, and a chatting mode;

identifying, by the processor, the multimedia content currently being viewed or used on the screen of the display unit in response to receiving the preset option interface key signal;

identifying, by the processor, the current mode selected by the user in response to receiving the preset option interface key signal;

generating, by the processor, a preliminary image corresponding to the identified multimedia content before displaying the option interface;

selecting, by the processor, one or more indicators out of a predetermined plurality of indicators to be displayed in the option interface based on: 1) the multimedia content currently being viewed or used on the screen of the display unit and 2) the current mode selected by the user, wherein each indicator corresponds to a unique action that is performed upon its selection by the user; and displaying the option interface including the selected one or more indicators and the preliminary image on the screen of the display unit, wherein actions associated with the one or more indicators include accessing at least one service of cloud-uploading the identified multimedia content, transferring the identified multimedia content to a personal device, performing a related search, adding the identified multimedia content to favorites, and sharing the identified multimedia content with another user, and the selecting of the one or more indicators to be displayed in the option interface comprises:

activating or deactivating the plurality of indicators, respectively, based on the identified multimedia content and whether the current mode selected by the user is the family mode, the private log-in mode, or the chatting mode.

2. A non-transitory computer-readable recorded medium having recorded thereon a program of instructions for performing the method of claim 1.

3. The method of claim 1, wherein the identified multimedia content includes at least one of a live program, an on-demand program, a menu, SNS information, a chat message, and a product.

4. The method of claim 1, wherein the preset option interface key signal is received from a remote controller, and the remote controller transmits the preset option interface key signal when a user presses a touch pad provided on a keypad for a preset amount of time or longer.

5. The method of claim 1, wherein the preliminary image includes a thumbnail image and a progression-status image corresponding to the identified multimedia content.

6. The method of claim 1, wherein:

the chatting mode is configured to concurrently output a chat message with another user and a live or an on-demand program on the screen, and the option interface in the chatting mode includes an indicator that enables content sharing in a limited manner with only a user currently involved in the chat.

7. The method of claim 1, wherein the one or more indicators can be selected by a touchpad or a direction key equipped on the remote control.

* * * * *